(12) United States Patent
Sun (10) Patent No.: US 8,239,900 B1
(45) Date of Patent: Aug. 7, 2012

(54) VIDEO BURSTING BASED UPON WIRELESS DEVICE LOCATION

(75) Inventor: Yaojun Sun, South Riding, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1015 days.

(21) Appl. No.: 12/199,468

(22) Filed: Aug. 27, 2008

(51) Int. Cl.
*H04N 7/173* (2011.01)
*H04N 7/16* (2011.01)
*H04N 7/20* (2006.01)

(52) U.S. Cl. ............. 725/90; 725/62; 725/93; 725/96; 725/98; 725/116

(58) Field of Classification Search .................. None
See application file for complete search history.

(56) References Cited

U.S. PATENT DOCUMENTS

| | | | |
|---|---|---|---|
| 6,839,080 B2 | 1/2005 | Meyers | |
| 7,003,033 B2 | 2/2006 | Kim et al. | |
| 7,343,157 B1 | 3/2008 | Mitchell | |
| 7,761,055 B2 * | 7/2010 | Laiho et al. | 455/41.2 |
| 8,127,326 B2 * | 2/2012 | Claussen et al. | 725/25 |
| 2002/0007491 A1 * | 1/2002 | Schiller et al. | 725/87 |
| 2002/0069406 A1 * | 6/2002 | Aaltonen et al. | 725/34 |
| 2003/0009576 A1 | 1/2003 | Apostolopoulos et al. | |
| 2003/0122924 A1 | 7/2003 | Meyers | |
| 2005/0155072 A1 * | 7/2005 | Kaczowka et al. | 725/95 |
| 2006/0026302 A1 | 2/2006 | Bennett et al. | |
| 2006/0031387 A1 | 2/2006 | Hamzeh et al. | |
| 2010/0111104 A1 * | 5/2010 | Luss | 370/468 |

* cited by examiner

*Primary Examiner* — Nasser Goodarzi
*Assistant Examiner* — Fred Peng
(74) *Attorney, Agent, or Firm* — O'Brien Jones, PLLC (57) ABSTRACT

What is disclosed is a method of operating a video system. The method includes, in a video server, monitoring a geographic location of a wireless communication device, transferring reference frames of a video for delivery to the wireless communication device over a wireless communication system if the geographic location is within a group of predefined geographic areas and stopping the transfer of the reference frames if the geographic location is not within the group of predefined geographic areas. The method also includes, in the video server, transferring update frames of the video for delivery to the wireless communication device over the wireless communication system without regard to whether the geographic location is within the group of predefined geographic areas. The method also includes, in the wireless communication device, receiving the reference frames and the update frames of the video over the wireless communication system and displaying the video.

20 Claims, 10 Drawing Sheets

VIDEO BURSTING BASED UPON WIRELESS DEVICE LOCATION

TECHNICAL FIELD

Aspects of the disclosure are related to the field of communications, and in particular, to streaming video over wireless communication networks.

TECHNICAL BACKGROUND

Wireless communication networks typically include wireless communication devices which, via a wireless communication system, communicate with further communication networks and equipment. The wireless communication system typically includes equipment to route communications over wireless links from the wireless communication devices to further communication networks, equipment, and destinations.

Some examples of wireless communication networks allow wireless communication devices to access video content held on video systems through the wireless communication system. These video systems transfer video content to the wireless communication devices utilizing the wireless communication network. However, video content many times requires consistently high wireless communication data bandwidths and relatively strong wireless signals to support the higher bandwidth video content.

Unfortunately, if a wireless communication device is located in a place of poor wireless coverage, or moving through areas of varying wireless coverage, for example, the video content may also suffer and be degraded or experience interruptions in playback. This can lead to a poor user experience due to jumpy or sporadic video content performance.

OVERVIEW

What is disclosed is a method of operating a video system. The method includes, in a video server, monitoring a geographic location of a wireless communication device, transferring reference frames of a video for delivery to the wireless communication device over a wireless communication system if the geographic location is within a group of predefined geographic areas and stopping the transfer of the reference frames if the geographic location is not within the group of predefined geographic areas. The method also includes, in the video server, transferring update frames of the video for delivery to the wireless communication device over the wireless communication system without regard to whether the geographic location is within the group of predefined geographic areas. The method also includes, in the wireless communication device, receiving the reference frames and the update frames of the video over the wireless communication system and displaying the video.

What is also disclosed is a method of operating a video system. The method includes, in a video server, receiving a request for a video from a wireless communication device over a wireless communication system, requesting a geographic location of the wireless communication device, requesting the video from a media storage system. The method also includes, in the media storage system, processing the request for the video and transferring the video to the video server. The method also includes, in the video server, monitoring the geographic location and transferring reference frames of the video for delivery to the wireless communication device over the wireless communication system if the geographic location is within a group of predefined geographic areas and stopping the transfer of the reference frames if the geographic location is not within the group of predefined geographic areas. The method also includes, in the video server, transferring update frames of the video for delivery to the wireless communication device over the wireless communication system without regard to whether the geographic location is within the group of predefined geographic areas.

What is also disclosed is a communication system. The communication system includes a video server is configured to receive a request for a video, monitor a geographic location of a wireless communication device, and transfer reference frames of the video for delivery to the wireless communication device over the wireless communication system if the geographic location is within a group of predefined geographic areas and stop the transfer of the reference frames if the geographic location is not within the group of predefined geographic areas. The video server is configured to transfer update frames of the video for delivery to the wireless communication device over the wireless communication system without regard to whether the geographic location is within the group of predefined geographic areas. The wireless communication device is configured to receive the video, process the reference frames and the update frames to determine a playback sequence of the video, and display the video in the playback sequence.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
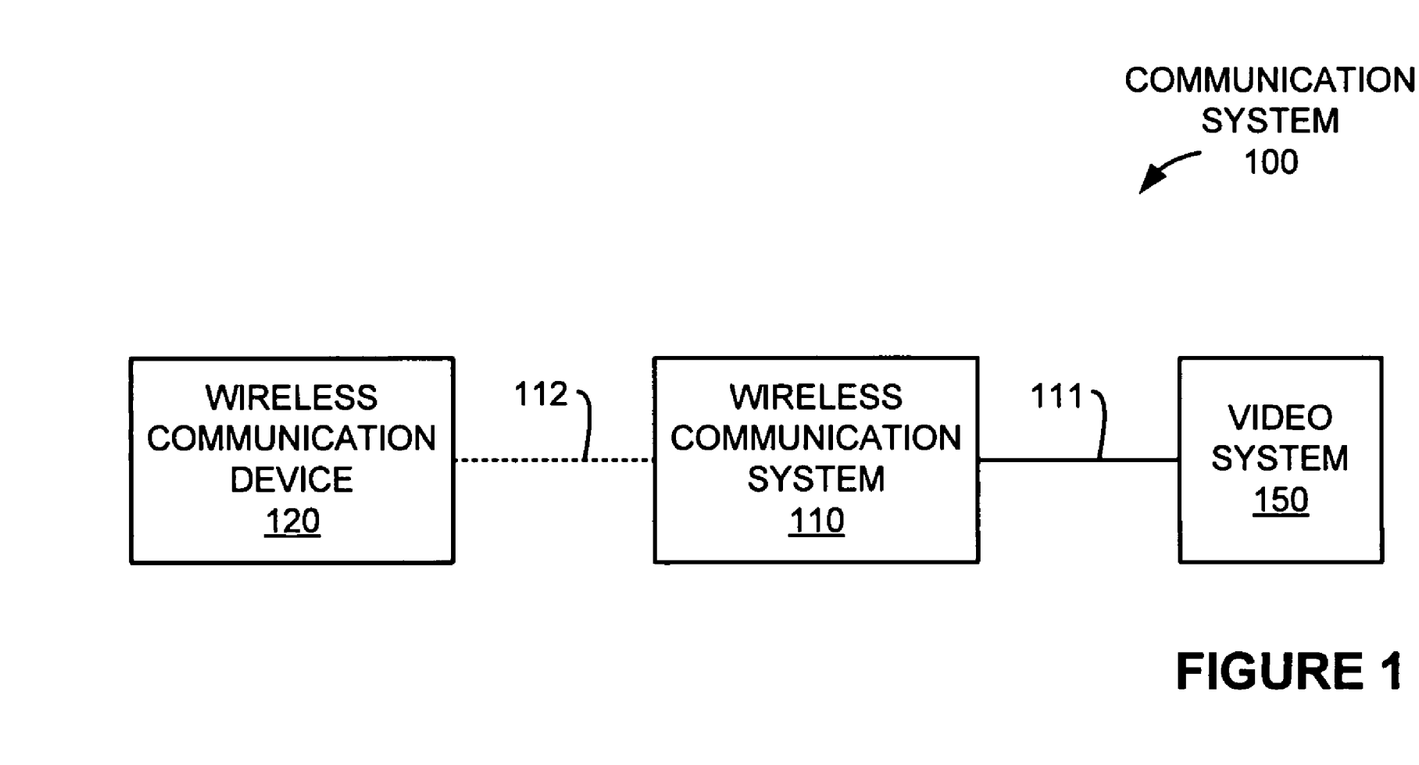
FIG. 1 is a system diagram illustrating a communication system.

FIG. 1 is a system diagram illustrating communication system 100. Communication system 100 includes wireless communication device 120, wireless communication system 110, and video system 150. Wireless communication device 120 and wireless communication system 110 communicate over wireless link 112. Video system 150 and wireless communication system 110 communicate over link 111.

Wireless communication device 120 comprises a telephone, transceiver, computer, digital assistant, smart phone, Internet appliance, or some other wireless communication apparatus—including combinations thereof.

Video system 150 includes equipment capable of serving or streaming video to wireless communication device 120. Examples of video system 150 include video servers, media storage systems, video controllers, computers, processing systems, storage-area networks, network-attached storage systems, or other equipment—including combinations thereof.

Wireless communication system 110 includes wireless communications network equipment capable of communicating with wireless communication device 120. Examples of wireless communication system 110 can include base stations, base transceiver stations, boomer stations, antennas, radio node controllers (RNC), mobile switching controllers, call processing equipment, wireless access points, telephone switches, Internet routers, network gateways, global-positioning system (GPS) receivers, terrestrial position-determining equipment (PDE) systems as well as other type of communication equipment—including combinations thereof.

Wireless link 112 uses various communication media, such as air, space, or some other wireless transport media—including combinations thereof. Wireless link 112 uses various protocols, such as worldwide interoperability for microwave access (WiMAX), long-term evolution (LTE), wireless fidelity (WiFi), code division multiple access (CDMA), global system for mobile communications (GSM), or some other communication format—including combinations or variations thereof.

Wireless link 112 may comprise many different signals sharing the same link. Wireless link 112 could include multiple signals operating in a single "airpath"—as represented by the dashed line in FIG. 1—comprising multiple frequencies, timeslots, transportation ports, logical transportation links, network sockets, IP sockets, packets, or communication directions. For example, communications and control signals between wireless communication device 120 and wireless communication system 110 could share the same wireless link 112, but be transferred over different frequencies, timeslots, packets, ports, sockets, logical transport links, or in different directions—including combinations thereof. In some examples, a logical transport link indicates a logical link at the application layer in a network hierarchy of the communication protocol employed. Examples of transportation ports include Transmission Control Protocol (TCP) ports, User Datagram Protocol (UDP) ports, or other transportation ports.

Link 111 uses various communication media, such as air, space, metal, optical fiber, or some other signal propagation path—including combinations thereof. Link 111 could be wired or wireless and use various communication protocols such as Internet, Internet protocol (IP), local-area network (LAN), optical networking, hybrid fiber coax (HFC), telephony, T1, or some other communication format—including combinations or variations thereof. Link 111 could be a direct link or might include various equipment, intermediate components, systems, and networks. Link 111 could include multiple signals operating in a single pathway in a similar manner as link 112.

Figure 2:
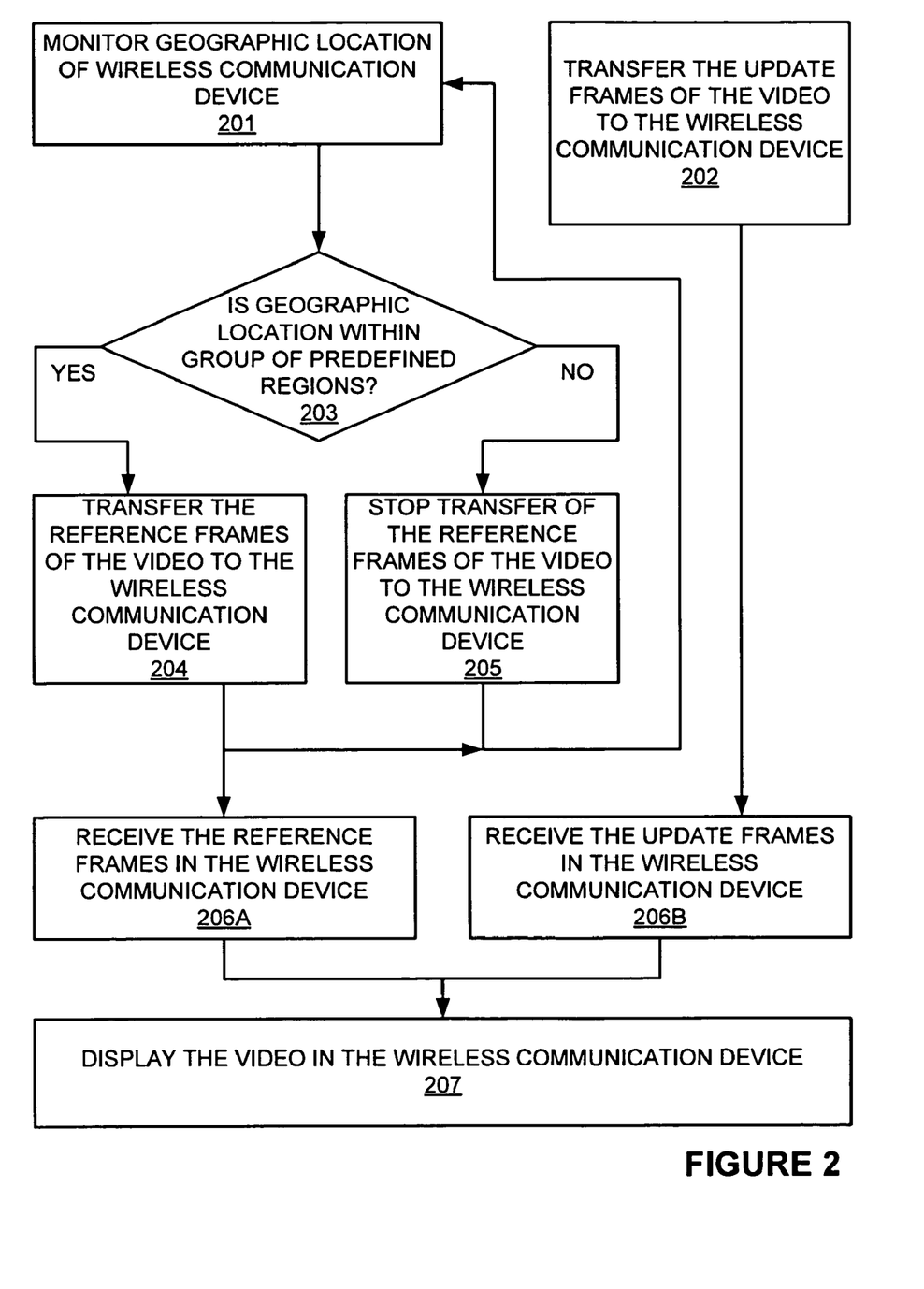
FIG. 2 is a flow diagram illustrating a method of operation of a video system.

FIG. 2 is a flow diagram that illustrates a method of operation of video system 150, as found in FIG. 1. The phases shown in FIG. 2 are indicated herein parenthetically. In FIG. 2, video system 150 monitors (201) a geographic location of wireless communication device 120.

The geographic location of wireless communication device 120 could be determined by many possible methods. In some examples, video system 150 receives the geographic location of wireless communication device 120 from wireless communication device 120. In other examples, video system 150 requests the geographic location of wireless communication device 120 from wireless communication system 110, possibly from a base station associated with wireless communication device 120. In examples where more than one base station is located within wireless communication system 110, video system 150 may first determine from which base station to request the geographic location of wireless communication device 120. Video system 150 could further query another system in wireless communication system 110 to obtain the geographic location of wireless communication device 120 or to obtain an indicator as to which base station is associated with wireless communication device 120.

In examples where wireless communication device 120 transfers a geographic location to video system 150, wireless communication device 120 could include a global-positioning system (GPS) receiver to enable a determination of geographic location. In other examples, wireless communication device 120 interfaces with external systems to determine a geographic location. In yet other examples, the geographic location of wireless communication device 120 is predetermined and stored in a digital storage medium for later use. In examples where the geographic location is determined by wireless communication system 110, a terrestrial position-determining equipment (PDE) system could be used to determine a geographic location of wireless communication device 120. In other examples, a triangulation method is used, while in yet other examples, an emergency services location procedure system is used. In examples where wireless communication system 110 determines the geographic location of wireless communication device 120, video system 150 could query wireless communication system 110 to obtain the geographic location of wireless communication device 120. In other examples, wireless communication system 110 could transfer the geographic location to video system 150.

Video system 150 then determines (203) if the geographic location of wireless communication device 120 is within a group of predefined geographic areas. If wireless communication device 120 is within the group of predefined geographic areas, video system 150 transfers (204) reference frames of a video to wireless communication device over wireless communication system 110. However, if wireless communication device 120 is not within the group of predefined geographic areas, then video system 150 stops (205) transfer of the reference frames of the video to wireless communication device 120.

In many examples, the group of predefined geographic areas is associated with a quality of wireless communications between wireless communication devices and wireless communication system 110. In some examples, the group of predefined geographic areas could indicate geographic regions known to be capable of higher quality wireless communications, such as higher bandwidth or higher bit rate communications. In other examples, the group of predefined geographic areas could indicate geographic regions of a particular RF signal quality, such as signal strength or noise level, of the wireless communications. In addition to the group of predefined geographic areas, other factors may also be monitored. For example, a service-level agreement (SLA) for a user of wireless communication device 120 may dictate differing levels of bandwidth, bit rates, or quality-of-service (QoS) allotted to the user. These SLA concerns could be considered and monitored along with the group of predefined geographic areas.

Video system 150, concurrently, and without regard to the geographic location of wireless communication device 120, transfers (202) update frames of the video to wireless communication device 120. It should be understood that other conditions on the transfer of the update frames could be utilized, such as when wireless communication device 120 is out of communication range of wireless communication system 110, when wireless communication device 120 is powered off, when faults are detected on wireless link 112 or link 111, among other conditions—including combinations thereof.

Figure 5:
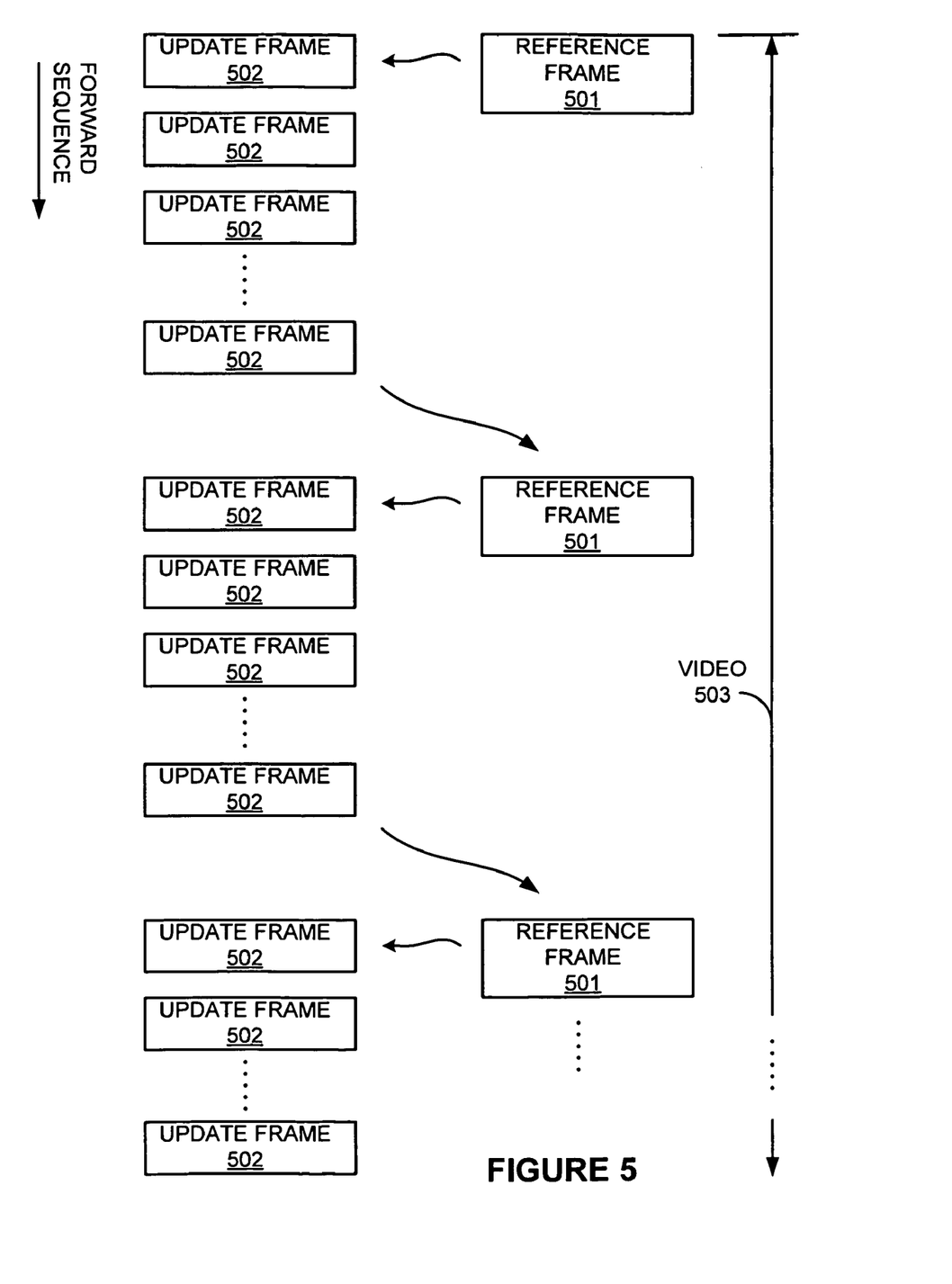
FIG. 5 is a diagram illustrating a sequence of reference frames and update frames of a video.

Wireless communication device 120 receives (206A) the reference frames of the video when transferred by video system 150. Wireless communication device 120 also receives (206B) the update frames of the video transferred from video system 150. Wireless communication device 120 then displays (207) both the reference frames and the update frames. Since the reference frames may be received in a different sequence with respect to the update frames, wireless communication device 120 may need to process the reference frames and the update frames and determine a playback sequence. In some examples, wireless communication device 120 stores the update frames in a buffer or cache while awaiting reference frames. As the reference frames are received, the update frames can then be transferred from the buffer and displayed in the correct sequence with the reference frames. An example of the relationship between reference frames and update frames is illustrated in FIG. 5, and discussed below.

During operation of video system 150, the process described above in phases 201-206 may be repeated throughout the transfer of a video. How frequently video system 150 monitors (201) the geographic location of wireless communication device 120 will vary depending upon many factors, including the intentions of the operator of video system 150, the quality of video desired to be transferred, the availability of geographic location information, the SLA of the user of wireless communication device 120, among other factors.

Figure 3:
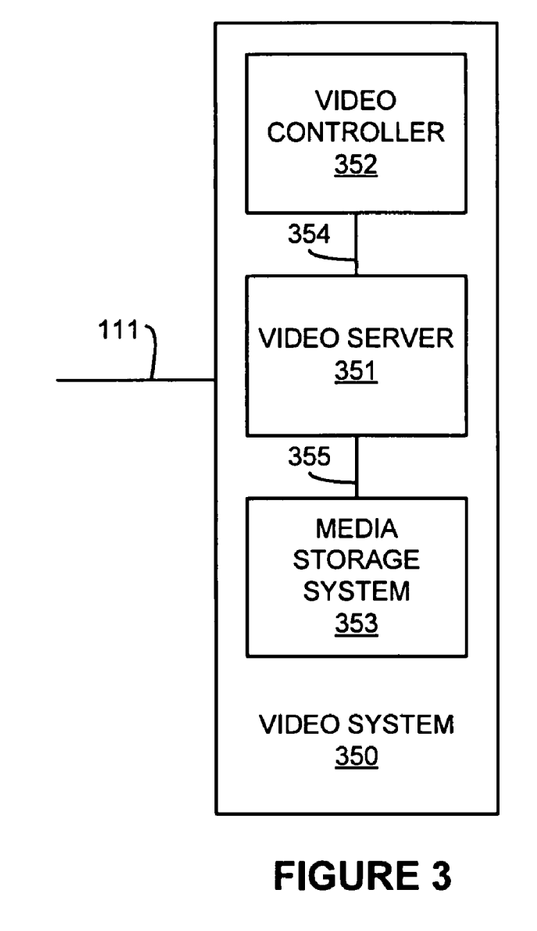
FIG. 3 is a block diagram illustrating an example of a video system.

FIG. 3 is a block diagram illustrating video system 350 as an example of video system 150, as found in FIG. 1. Video system 350, in this example, includes video server 351, video controller 352, and media storage system 353. Video server 351 and video controller 352 are communicatively linked by link 354. Video server 351 and media storage system 353 are communicatively linked by link 355.

Video server 351 includes processing systems, file servers, video streaming systems, computer systems, or other video serving or streaming equipment, including combinations thereof.

Video controller 352 includes equipment for controlling the operations of video server 351. Video controller 352 could incorporate a computer microprocessor, circuitry, or some other processing device or software system, and may be distributed among multiple processing devices. In some examples, video controller 352 is located within the same equipment as video server 351. Video controller 352 may also include software such as an operating system, logs, utilities, drivers, networking software, and other software which is typically stored on a computer-readable medium.

Media storage system 353 comprises a digital storage system for storing audio-visual media, such as video, images, and other related content. Media storage system 353 could include a computer-readable medium such as a disk, tape, integrated circuit, server, or some other memory device, and also may be distributed among multiple memory devices. In some examples, media storage system 353 comprises a storage-area network (SAN) or network-attached storage (NAS) system which stores a large collection of videos for access over a network interface. In other examples, media storage system 353 could be a temporary buffer system which facilitates the transfer of live video to video server 351.

Links 354-355 comprise physical, logical, or virtual communication links, capable of communicating video data, control signals, along with other information. In some examples, links 354-355 are encapsulated within the elements of video server 351, video controller 352, or media storage system 353 and may be a software or logical link. Links 354-355 use various communication media, such as air, space, metal, optical fiber, or some other signal propagation path—including combinations thereof. Links 354-355 could be wired or wireless and use various communication protocols such as Internet, Internet protocol (IP), local-area network (LAN), optical networking, hybrid fiber coax (HFC), telephony, T1, or some other communication format—including combinations or variations thereof. Links 354-355 could be a direct links or might include various equipment, intermediate components, systems, and networks.

Figure 4:
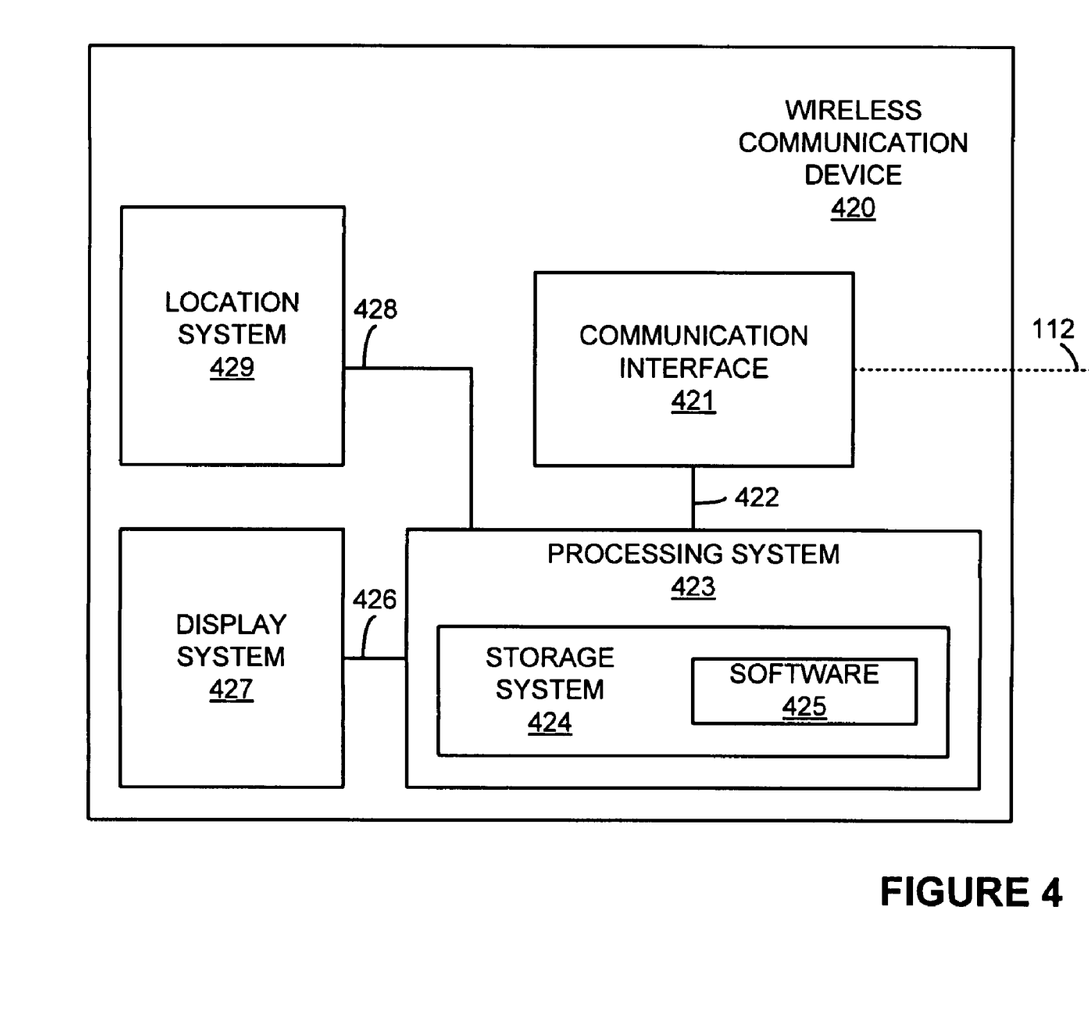
FIG. 4 is a block diagram illustrating an example of a wireless communication device.

FIG. 4 illustrates a block diagram of wireless communication device 420 as an example of wireless communication device 120, as found in FIG. 1. Wireless communication device 420, in this example, includes communication interface 421, processing system 423, display system 427, and location system 429. Processing system 423 includes storage system 424. Storage system 424 stores software 425. Processing system 423 is communicatively linked to communication interface 421 by link 422. Processing system 423 is communicatively linked to display system 427 by link 426. Processing system 423 is communicatively linked to location system 429 by link 428. Wireless communication device 420 may be distributed among multiple devices that together form elements 421-427.

Communication interface 421 comprises antennas, transceivers, circuitry, as well as other types of communication components—including combinations thereof.

Processing system 423 retrieves and executes software 425 from storage system 424. Processing system 423 could incorporate a computer microprocessor, logic circuit, or some other processing device, and may be distributed among multiple processing devices. In some examples, processing system 423 is located within the same equipment in which communication interface 421, display system 427, or location system 429 are located. Storage system 424 could include a computer-readable medium such as a disk, tape, integrated circuit, server, or some other memory device, and also may be distributed among multiple memory devices. Software 425 may include an operating system, logs, utilities, drivers, networking software, and other software typically loaded onto a computer system. Software 425 could contain an application program, firmware, or some other form of computer-readable processing instructions. When executed by processing system 423, software 425 directs processing system 423 to operate as described herein.

Display system 427 includes circuitry and a viewscreen or user display used for viewing video content on wireless communication device 420. In some examples, display system 427 includes a viewscreen integrated into wireless communication device 420, while in other examples, display system 427 may include an interface to a display system external to wireless communication device 420.

Location system 429 includes equipment capable of determining a geographic location of wireless communication device 420. Examples of location system 429 include a global-positioning system (GPS) receiver, a terrestrial position determining equipment (PDE) system, a triangulation-based location system, an emergency services location procedure system, or some other type of location determining system, including combinations thereof. Other examples of location system 429 include merely an interface configured to communicate with external equipment capable of determining a geographic location of wireless communication device 420, where location would then be received by location system 429. In another example, location system 429 may be digital storage including the geographic location of wireless communication device 420.

Links 422, 426, and 428 comprise physical, logical, or virtual communication links, capable of communicating data, control signals, and communications, along with other information. In some examples, links 422, 426, and 428 are encapsulated within the elements of communication interface 421, processing system 423, display system 427, or location system 429 and may be a software or logical link. In other examples, links 422, 426, and 428 use various communication media, such as air, space, metal, optical fiber, or some other signal propagation path—including combinations thereof. Links 422, 426, and 428 could be wired or wireless and use various protocols or communication formats as described herein for wireless link 112—including combinations or variations thereof. Links 422, 426, and 428 could be a direct link or it might include various equipment, intermediate components, systems, and networks.

FIG. 5 is a diagram illustrating a sequence of reference frames 501 and update frames 502 of video 503. Video 503 is comprised of several frames, or time-correlated image elements of a video. These frames, when accumulated in a sequence, correspond to a portion of video 503. In many examples of video 503, several frames are used to comprise one portion, such as one second, of video 503. The length of time of video 503 could be predetermined, as in the example of a fixed-length movie, or could be open-ended, as in the case of streaming newscast or sporting event which may continue indefinitely.

In some examples, such as shown in FIG. 5, reference frame types 501 and update frame types 502 comprise a portion of video 503. Each reference frame 501 is typically a frame type used as a reference or key for an update frame 502. Update frames 502 indicate a change, difference, or delta in the previous frame in a sequence of frames. In many typical examples, reference frames 501 contain much more data than update frame 502, and likewise require much more bandwidth to transfer.

In FIG. 5, reference frames 501 precede a series of update frames 502. Each update frame 502 indicates a change to the previous frame, whether the previous frame is a reference frame 501 or another update frame 502. Several update frames 502 can follow a particular reference frame 501, depending upon the video format used. In some example formats, each reference frame 501 occurs once for every ½ second of video 503, with update frames 502 occurring when a reference frame 501 does not, to establish a total frame rate of 24 or 30 frames per second of video 503. In other examples, more or less frames of each type could comprise each second of video 503.

Reference frames 501 include information relating to an entire visible frame of video, typically comprising enough data to complete an image or picture encompassing the entire viewable portion or scene of a video. This is in contrast to update frames 502, which typically include only a subset of the information that encompasses the entire viewable portion of a video. As mentioned above, the update frames 502 indicate a change from a neighboring frame, where the neighboring frame could be either a reference frames 501 or update frames 502. In this manner, each update frame 502 need only contain a smaller amount of data than a reference frame 501. For example, a video containing a person walking past an unchanging or slowly changing background would typically require the update frames 502 to include information changing from one frame to the next (i.e. information relating to the motion of the person), whereas the reference frames 502 would typically include information encompassing the entire viewable portion of the video (i.e. information relating to the person and the background).

In addition to containing image data, reference frames 501 and update frames 502 can also contain sequencing information relating to a display order and a transmit order. However, a reference frame must be displayed first in order for subsequent update frames 502 to have a baseline or key from which a delta or change can be determined. In many examples, video 503 can be displayed in forward sequence or reverse sequence through a similar use of reference frames 501 and update frames 502.

In examples of compressed video, such as MPEG video, reference frames 501 can include a frame type referred to as intra-frames (I frames), whereas update frames 502 can include several frame types referred to as predicted (P frames) or bidirectional frames (B frames). Several examples variants of MPEG video exist, such as MPEG-1, MPEG-2, or MPEG-4, each incorporating similar principles as discussed herein. Other example video formats include QuickTime, DivX, VCEG, H.264, Windows Media Video (WMV), Ogg Theora, or other compressed video formats, which may follow similar frame utilization principles as found in MPEG.

Figure 6:
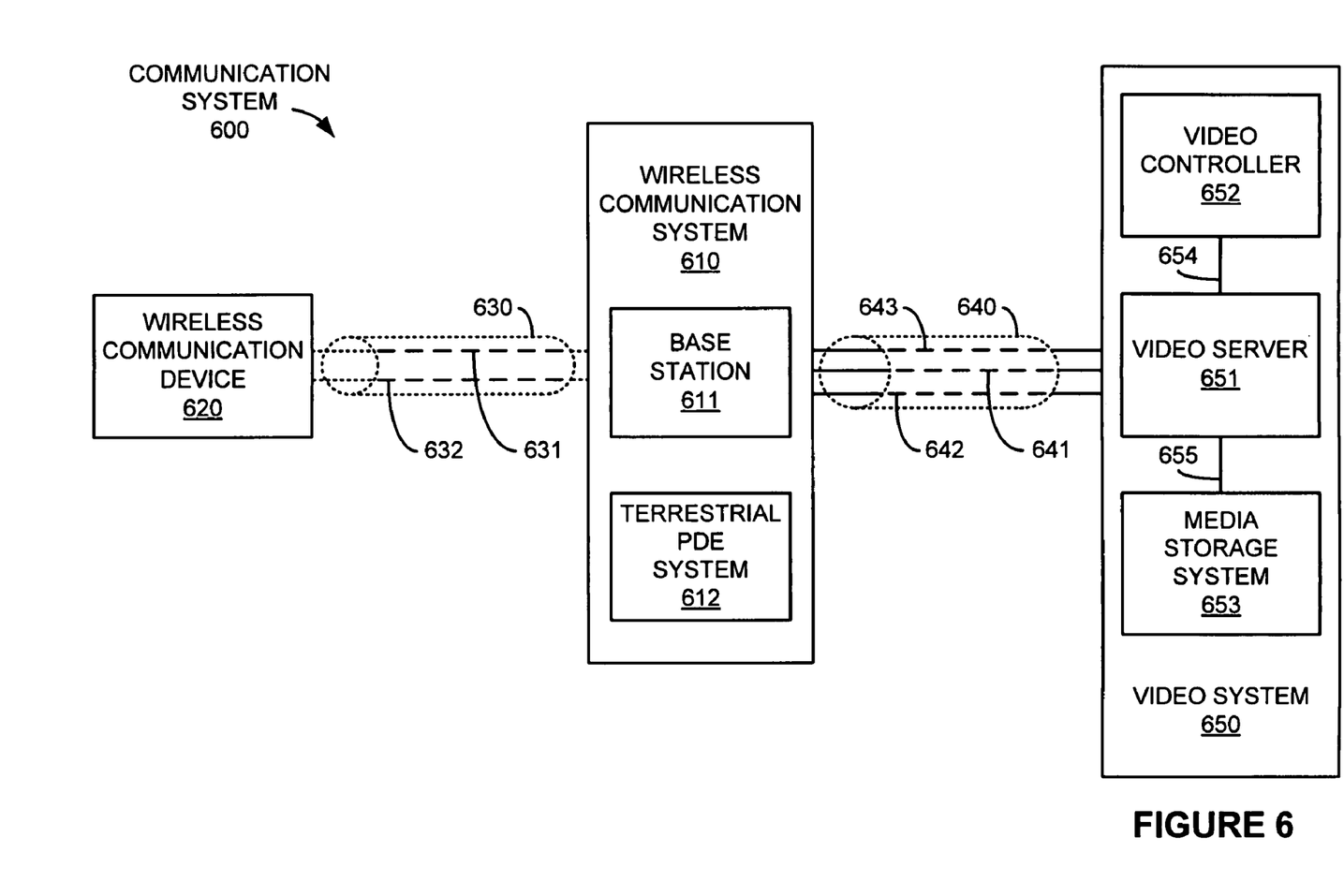
FIG. 6 is a system diagram illustrating a communication system.

FIG. 6 is a system diagram illustrating communication system 600. Communication system 600 includes wireless communication device 620, wireless communication system 610, and video system 650. Wireless communication device 620 and wireless communication system 610 communicate over wireless link 630. Video system 650 and wireless communication system 610 communicate over link 640. Wireless link 630 includes logical transport links 631-632. Link 640 includes logical transport links 641-643.

Wireless communication device 620 comprises a smart phone capable of displaying video in this example. Wireless communication system 610 includes wireless communications network equipment capable of communicating with wireless communication device 620. As shown in FIG. 6, wireless communication system 610 includes base station 611 and terrestrial position-determining equipment (PDE) system 612. In other examples, a different number of wireless communication devices and base stations may be located in communication system 600.

Video system 650 includes equipment capable of transferring or streaming video to wireless communication device 620. As shown in FIG. 6, video system 650 comprises video server 651, video controller 652, and media storage system 653. Video server 651 and video controller 652 are communicatively linked by link 654. Video server 651 and media storage system 653 are communicatively linked by link 655. In some examples, video controller 652, media storage system 653, or links 654-655 are located within the same equipment in which video server 651 is located.

Video server 651 includes a data server for transferring video frames over wireless communication system 610 to wireless communication device 620. Video controller 652 includes equipment for controlling the operations of video server 651, and comprises a computer system. Media storage system 653 comprises a digital storage system for storing video frames and related content. In this example, media storage system 653 comprises a storage-area network (SAN) which stores a large collection of videos.

Links 654 and 655 comprise IP network links between video server 651 and video controller 652, and video server 651 and media storage system 653, respectively. Link 640 comprises a T1 connection between video system 650 and wireless communication system 610. Wireless link 630 uses the long-term evolution (LTE) protocol to exchange communications between wireless communication device 620 and wireless communication system 610.

Wireless link 630 and link 640 may comprise many different signals sharing the same link. As shown in FIG. 6, wireless link 630 and link 640 include several logical transport links. Wireless link 630 includes logical transport links 631-632. Link 640 includes logical transport links 641-643. In this example, these logical transport links indicate routes between different transportation ports on the associated equipment.

Terrestrial position determining equipment (PDE) 612 includes equipment capable of determining a geographic location of wireless communication device 620. Terrestrial PDE system could determine a position of wireless communication device 620 via a triangulation-based location, an emergency services location procedure, or by some other type of location determining method, including combinations thereof.

Figure 7:
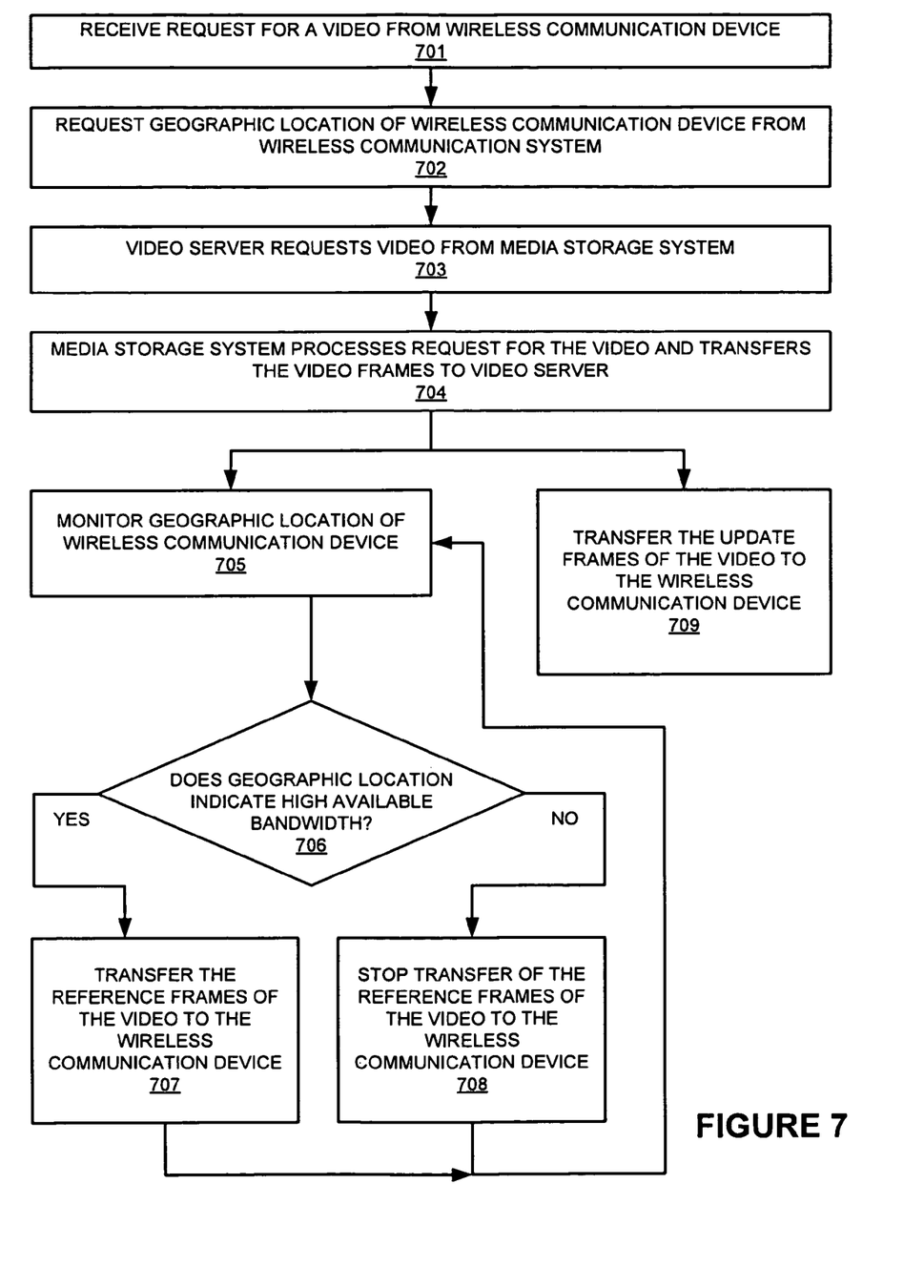
FIG. 7 is a flow diagram illustrating a method of operation of a communication system.

FIG. 7 is a flow diagram that illustrates a method of operation of communication system 600, as found in FIG. 6. The phases shown in FIG. 7 are indicated herein parenthetically. In FIG. 7, video system 650 receives (701) a request for a video from wireless communication device 620.

Video controller 652 then requests (702) the geographic location of wireless communication device 620. In this example, video controller 652 requests this geographic location from terrestrial position-determining (PDE) system 612 in wireless communication system 610 over logical transport link 643.

In other examples, video controller 652 requests this geographic location from base station 611. In examples where more than one base station is located within wireless communication system 610, video controller 652 must first determine from which base station to request the geographic location. Video controller 652 could query another system in wireless communication system 610 to obtain an indicator as to which base station has information related to the geographic location of wireless communication device 620.

Video server 651 then requests (703) the video, as requested by wireless communication device 620, from media storage system 653. Media storage system 653 processes (704) the request for the video and begins to transfer the frames of the video to video server 651 over link 655.

Video controller 652 monitors (705) the geographic location of wireless communication device 620. Video controller 652 then determines (706) if the geographic location is within a group of predefined geographic areas, which, in this example indicates a geographic area of a particular wireless communications bandwidth potential. If the geographic location of wireless communication device 620 is within is within the group of predefined geographic areas indicating a high enough bandwidth potential of wireless communications over wireless link 630, then video server 651 transfers (707) reference frames of a video to wireless communication device 620 over wireless communication system 610 through base station 611. The reference frames could be transferred over logical transport link 641 between video server 651 and base station 611, and over logical transport link 631 between base station 611 and wireless communication device 620. However, if the geographic location of wireless communication device 620 is not within is within the group of predefined geographic areas, thus not indicating a high enough bandwidth potential of wireless communications over wireless link 630, then video server 651 stops (708) transfer of the reference frames of the video to wireless communication device 620.

Video server 651, concurrently, and without regard to the geographic location of wireless communication device 620, transfers (709) update frames of the video to wireless communication device 620. The update frames could be transferred over logical transport link 642 between video server 651 and base station 611, and over logical transport link 632 between base station 611 and wireless communication device 620.

During operation of communication system 600, the process described above in phases 702 and 705-708 may be repeated throughout the transfer of a video. How frequent video controller 652 checks the geographic location of wireless communication device 620 will vary depending upon many factors, including the intentions of the operator of video system 650, the quality of video desired to be transferred, the service level agreement (SLA) between the user of wireless communication device 620 and the operator of wireless communication system 610, or other factors.

Figure 8:
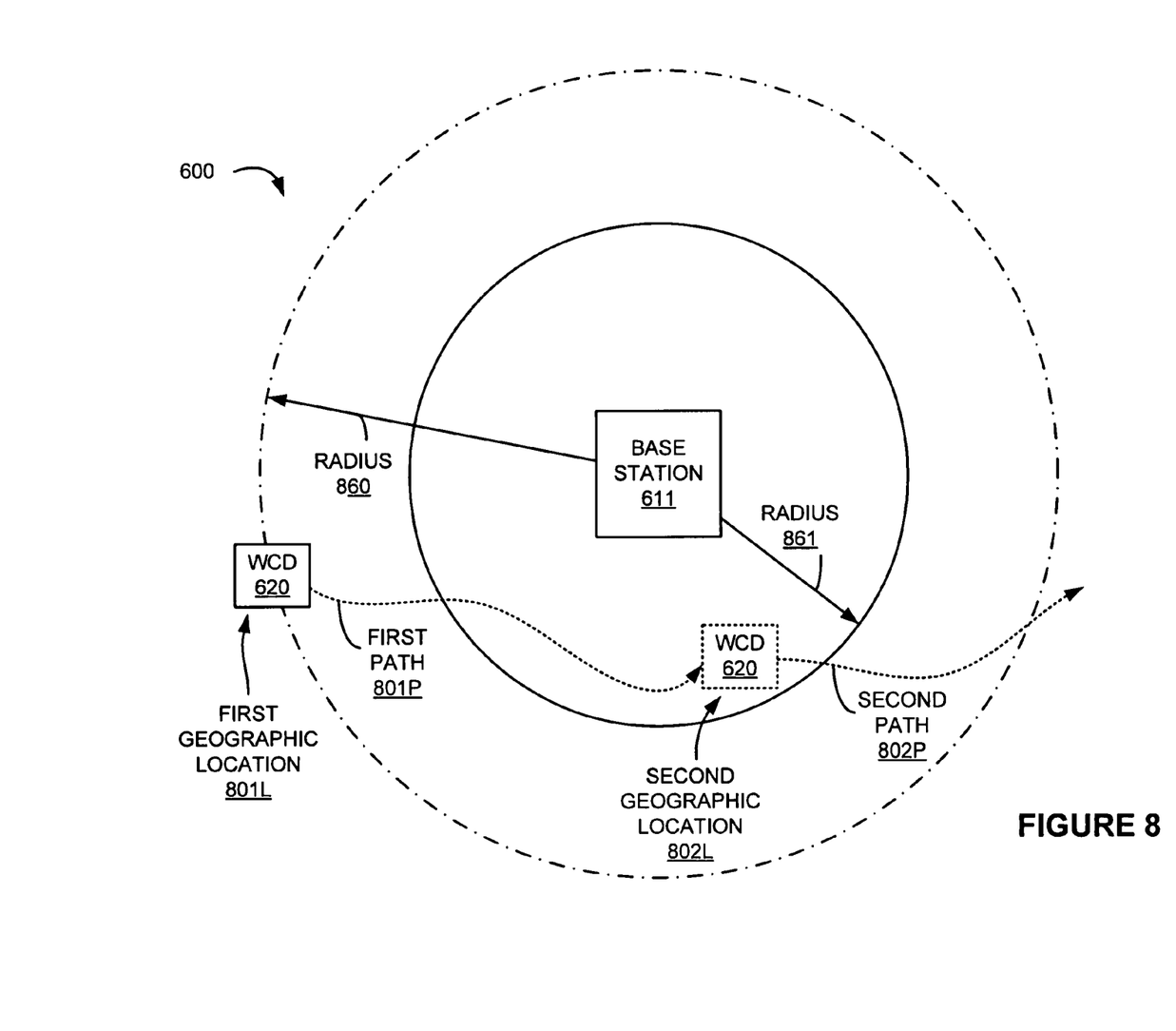
FIG. 8 is a diagram illustrating an overhead representation of a communication system.

FIG. 8 illustrates an overhead representation of communication system 600, as found in FIG. 6. FIG. 8 includes wireless communication device (WCD) 620 and base station 611, both also found in FIG. 6. Wireless communication system 610, video system 650, wireless link 630, and link 640 are not shown in FIG. 8 for clarity.

FIG. 8 shows two geographic locations of WCD 620. First geographic location 801L represents an initial geographic location of WCD 620. Second geographic location 802L represents a subsequent geographic location of WCD 620, after WCD 620 traverses first path 801P.

In FIG. 8, wireless communications could be transmitted and received by base station 611 as well as by WCD 620. Base station 611 has a limited geographic range over which it can support high-bandwidth communications with WCD 620. In some examples, this limited range could be a function of the signal strength of base station 611 or WCD 620, determined by the operator of wireless communication system 610 or video system 650, a function of the geographic location of base station 611 or WCD 620, a limitation of the communication protocol employed, or some other factor. In other examples, the limited range could be defined by a region beyond which wireless communication devices must transmit with a high signal energy level to establish effective communications with base station 611, where such a high signal energy level is determined to cause too much interference with a neighboring base station or other wireless communication devices in communication system 600.

The limited range over which base station 611 can support high-bandwidth communications with wireless communication devices is indicated by radius 861. WCD 620 at first geographic location 801L is shown located a distance of radius 860 from base station 611. WCD 620 at second geographic location 802L is shown located a distance within radius 861 from base station 611. Radius 860 represents a distance which is farther away from base station 611 than radius 861.

In this example, base station 611 and WCD 620 would not be able to normally support high-bandwidth communications at first geographic location 801L, as too great a distance separates the two. Thus, when WCD 620 is at first geographic location 801L, reference frames of a video would not be transferred from video server 651 to WCD 620. However, WCD 620 transits first path 801P to arrive at second geographic location 802L. At second geographic location 802L, being within radius 861, base station 611 and WCD 620 would be able to support high-bandwidth communications. Thus, when WCD 620 is at second geographic location 802L, reference frames of a video would be transferred from video server 651 to WCD 620. As similarly described above regarding FIG. 7, the update frames of a video would be transferred from video server 651 to WCD 620 without regard to first geographic location 801L or second geographic location 802L. As a further example, WCD 620 could then transit second path 802P to arrive at further geographic locations. The determination of whether or not to transfer reference frames while WCD 620 is at a further geographic location would occur as described herein.

Although circular regions, as defined by radii 860 and 861, are shown in FIG. 8, it should be understood that the geographic regions which are chosen to allow for transfer of reference frames between video server 651 and WCD 620 could be of other configurations, as determined by geographic features, empirical data, the desires of the operators of wireless communication system 610 or video system 650, or by other means, including combinations thereof.

Figure 9:
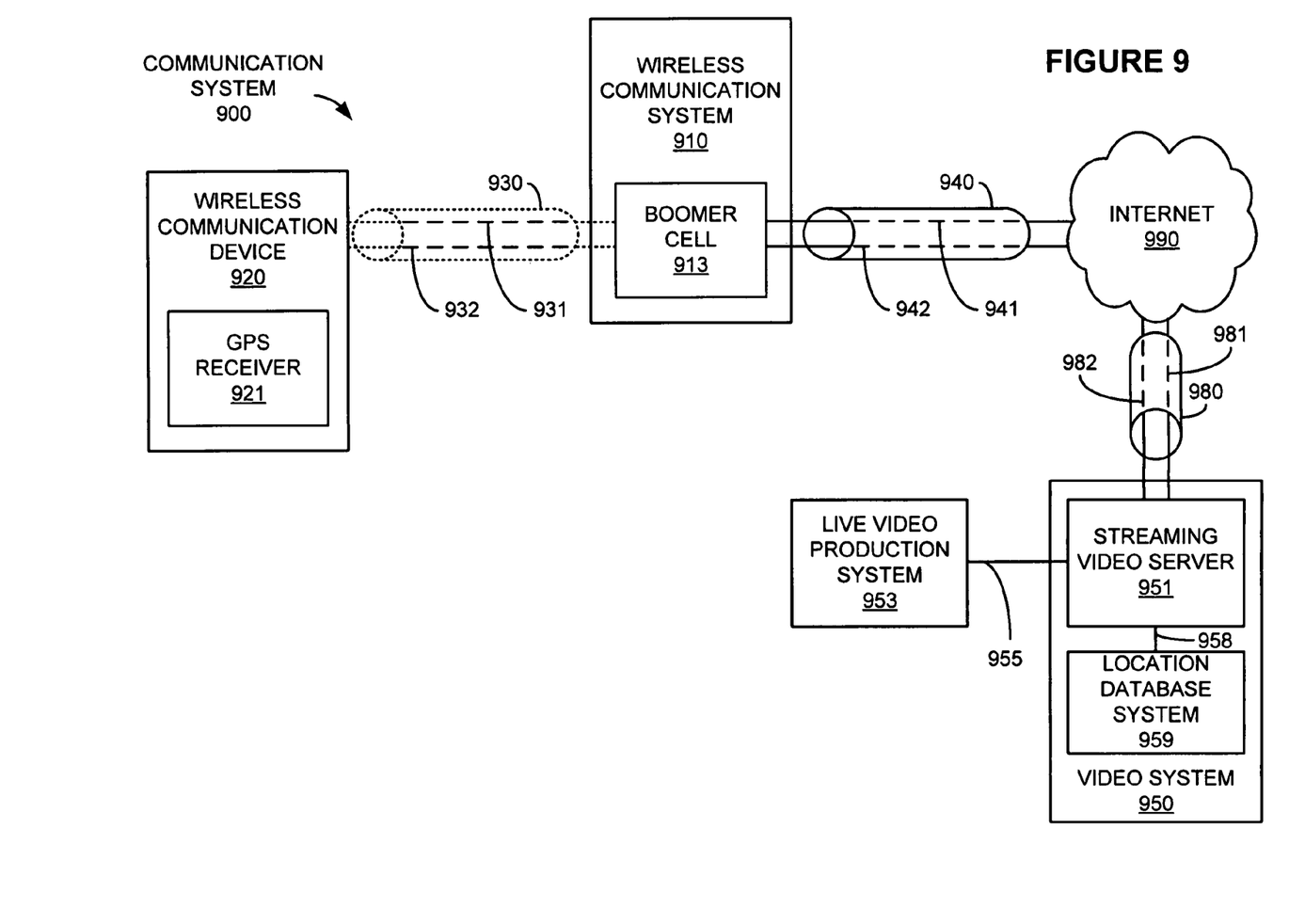
FIG. 9 is a system diagram illustrating a communication system.

FIG. 9 is a system diagram illustrating communication system 900. Communication system 900 includes wireless communication device 920, wireless communication system 910, video system 950, live video production system 953, and Internet 990. Wireless communication device 920 and wireless communication system 910 communicate over wireless link 930. Video system 950 and wireless communication system 910 communicate through Internet 990 over links 980 and 940. Wireless link 930 includes logical transport links 931-932. Link 940 includes logical transport links 941-942. Link 980 includes logical transport links 981-982.

Wireless communication device 920 comprises a wireless-enabled laptop computer capable of displaying video in this example. Wireless communication device 920 includes global-positioning system (GPS) receiver 921. GPS receiver 921 includes circuitry, processors, or equipment capable of determining a geographic location of wireless communication device 920.

Wireless communication system 910 includes wireless communications network equipment capable of communicating with wireless communication device 920. As shown in FIG. 9, wireless communication system 910 includes boomer cell 913. A boomer cell is an example of a base station tailored to service a high number of wireless communication devices over a large geographic area, such as a metropolitan area. In other examples, a different number of wireless communication devices and base stations may be located in communication system 900.

Video system 950 includes equipment capable of transferring or streaming video to wireless communication device 920. As shown in FIG. 9, video system 950 includes streaming video server 951 and location database system 959. Streaming video server 951 includes a data server and routing equipment for transferring streaming video over Internet 990 and wireless communication system 910 to wireless communication device 920. Location database system 959 includes a database and a computer processing system including a digital storage medium, readable by the computer processing system, which stores the database thereon. The database includes information related to groups of predefined geographic areas associated with wireless communication system 910. Streaming video server 951 and location database system 959 communicate over network link 958.

Live video production system 953 includes equipment associated with capturing, digitizing, compressing, and transferring live video from events such as sporting events or on-site news coverage. Streaming video server 951 and live video production system 953 are communicatively linked by link 955.

Link 955 comprises an IP network link between streaming video server 951 and live video production system 953. Links 940 and 980 comprise high-speed optical connections between video system 950, Internet 990, and wireless communication system 910. Wireless link 930 uses worldwide interoperability for microwave access (WiMAX) to exchange communications between wireless communication device 920 and wireless communication system 910.

Wireless link 930, link 940, and link 980 may comprise many different signals sharing the same link. As shown in FIG. 9, wireless link 930, link 940, and link 980 include several logical transport links. Wireless link 930 includes logical transport links 931-932. Link 940 includes logical transport links 941-942. Link 980 includes logical transport links 981-982. In this example, these logical transport links represent different IP socket pathways between the associated equipment.

Figure 10:
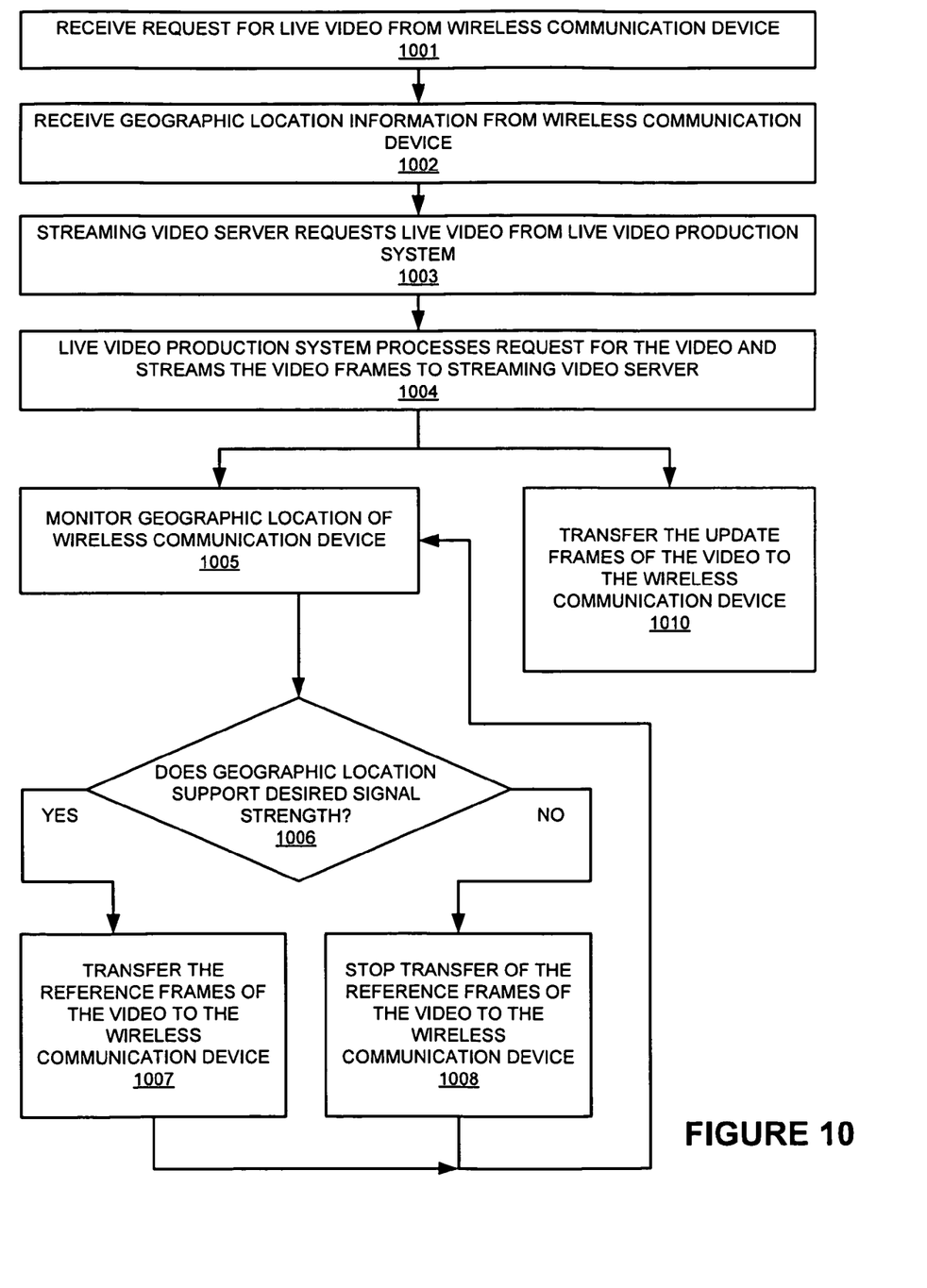
FIG. 10 is a flow diagram illustrating a method of operation of a communication system.

FIG. 10 is a flow diagram that illustrates a method of operation of communication system 900, as found in FIG. 9. The phases shown in FIG. 10 are indicated herein parenthetically. In FIG. 10, streaming video server 951 receives (1001) a request for live video from wireless communication device 920.

Streaming video server 951 then receives (1002) a geographic location of wireless communication device 920. In this example, streaming video server 951 requests this geographic location from wireless communication device 920. In other examples, wireless communication device 920 provides this geographic location with the request for video, or at a later time. Wireless communication device 920 includes global-positioning system (GPS) receiver 921 in this example, which determines the geographic location of wireless communication device 920.

Streaming video server 951 then requests (1003) the live video, as requested by wireless communication device 920, from live video production system 953. Live video production system 953 processes (1004) the request for the live video and begins to stream the frames of the live video to streaming video server 951 over link 955. Live video production system 953 could include, in this example, equipment associated with capturing, digitizing, compressing, and transferring live video. However, in other examples, live video production system 953 transfers uncompressed and possibly analog video to streaming video server 951. Streaming video server 951 could be configured to digitize and/or compress the video for transport to wireless communication device 920. In yet other examples, although the video may be digitized and compressed prior to arrival in streaming video server 951, the video may undergo a format, compression, or encoding change in streaming video server 951 to place the video in a format compatible for decoding on wireless communication device 920.

Streaming video server 951 monitors (1005) the geographic location of wireless communication device 920, as determined by GPS receiver 921 in wireless communication device 920. Streaming video server 951 then determines (1006) if the geographic location of wireless communication device 920 is within a group of predetermined geographic areas.

To determine if the geographic location of wireless communication device 920 is within the group of predefined geographic areas, location database system 959 is queried with the geographic location. Location database system 959 could then transfer a response indicating if the geographic location was within the group of predefined geographic areas. As discussed above, location database system 959 includes a database and a computer processing system which stores information related to groups of predefined geographic areas associated with wireless communication system 910. These groups of predefined geographic areas could correspond to geographic regions around boomer cell 913 which correspond to a certain bandwidth, signal strength, or other factors of wireless communications with wireless communication device 920. In this example, the geographic areas denote regions within wireless communication system 910 that support a desired signal strength of wireless communications.

If the geographic location is within a geographic area indicating support for a desired signal strength, streaming video server 951 transfers (1007) reference frames of the video to wireless communication device 920 over Internet 990 and wireless communication system 910 through boomer cell 913. The reference frames could be transferred over logical transport link 981 between streaming video server 951 and Internet 990, over logical transport link 941 between Internet 990 and boomer cell 913, and over logical transport link 931 between boomer cell 913 and wireless communication device 920. However, if the geographic location is not within a geographic area indicating support for a desired signal strength for wireless communications over wireless link 930, then streaming video server 951 stops (1008) transfer of the reference frames of the video to wireless communication device 920. Since streaming video server 951 is transferring live video content in this example, a buffering system could be incorporated into streaming video server 951 to prevent the dropping or skipping of reference frames waiting to be transferred to wireless communication device 920.

Streaming video server 951, concurrently, and without regard to the geographic location of wireless communication device 920, transfers (1009) update frames of the video to wireless communication device 920. The update frames could be transferred over logical transport link 982 between streaming video server 951 and Internet 990, over logical transport link 942 between Internet 990 and boomer cell 913, and over logical transport link 932 between boomer cell 913 and wireless communication device 920.

During operation of communication system 900, the process described above in phases 1002 and 1005-1008 may be repeated throughout the transfer of a video. How frequent streaming video server 951 checks the status of the geographic location of wireless communication device 920 will vary depending upon many factors, including the intentions of the operator of video system 950, the quality of video desired to be transferred, SLA concerns of wireless communication system 910, or other factors.

In further examples, wireless communication device 920 monitors a playback quality of the video and transfers an indicator of the playback quality to streaming video server 951. Streaming video server 951 could then transfer this indication of playback quality to location database system 959 along with the geographic location of wireless communication device 920. In this manner, location database system 959 could be configured to create a database of geographic regions of different playback quality. Advantageously, involvement of wireless communication system 910 would not be needed for the operator of video system 950 to create a database, or even a map, indicating which geographic locations within wireless communication system 910 correspond to high quality video playback. In other examples, the database could be predetermined based upon information from the operator of wireless communication system 910 and the indicator of playback quality could be used to update or refine the database in location database system 959.

Advantageously, a video system configured as described herein can provide a higher quality of video service and possibly better user experience over wireless links where the quality of wireless communications can vary when a wireless communication device transits across geographic locations. Since, in many of the examples included herein, reference frames are transferred separately from update frames, and the reference frames are only transferred when the quality of the wireless link between a wireless communication device and a wireless communication system can support, for example a certain bandwidth, a wireless communication device can buffer up the generally smaller update frames separately from the generally larger reference frames. When the quality of the wireless link, as defined by geographic location, allows for transfer of the reference frames, the video server can then transfer these generally larger reference frames, making efficient use of the resources of the wireless link. Thus, the transfer of the reference frames will typically not impede the transfer of the generally smaller—and more frequent—update frames. In many examples of compressed video, many more update frames are required than reference frames for each second of video.

In a wireless communication device, the reference frames and the update frames are then re-sequenced according to a desired playback sequence and displayed. In such a manner, a compressed video can be transferred from a video server to a wireless communication device over a wireless communication system in a more efficient manner resulting in a better user experience and possibly higher frame transfer and/or playback rates of the video.

In addition to, or alternatively from the separate transfer of reference frames and update frames, other methods may be employed to make more efficient use of the changing bandwidth capabilities of a wireless link based upon a geographic location. For example, when the geographic location indicates a certain quality level of wireless communications between a wireless communication device and a wireless communication system, the video transferred from a video server could comprise a different format, encoding scheme, or resolution, among other changes. A video server could possibly request this different video format from a media storage system in some examples. Advantageously, by sending a lower resolution video format during periods of lower quality wireless communications, more efficient use of the available wireless bandwidth could be made while still maintaining the user experience and keeping the frame transfer rate at a desired level. In other examples, a different and possibly more lossy video compression scheme could be used during periods of lower quality wireless communication to achieve a similar effect.

FIGS. 1-10 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a video system comprising:
in a video server, monitoring a geographic location of a wireless communication device;
in the video server, transferring reference frames of a video for delivery to the wireless communication device over a wireless communication system if the geographic location is within a group of predefined geographic areas and stopping the transfer of the reference frames if the geographic location is not within the group of predefined geographic areas;
in the video server, transferring update frames of the video for delivery to the wireless communication device over the wireless communication system without regard to whether the geographic location is within the group of predefined geographic areas;
in the wireless communication device, receiving the reference frames and the update frames of the video over the wireless communication system; and
in the wireless communication device, displaying the video.

2. The method of operating the video system of claim 1, wherein transferring the reference frames comprises transferring the reference frames over a first logical transport link;
wherein transferring the update frames comprises transferring the update frames over a second logical transport link;
wherein receiving the reference frames and the update frames comprises receiving the reference frames over the first logical transport link and receiving the update frames over the second logical transport link; and
wherein displaying the video comprises determining a playback sequence among the reference frames and the update frames and displaying the video.

3. The method of operating the video system of claim 2, wherein the first logical transport link comprises a first transportation port and the second logical transport link comprises a second transportation port.

4. The method of operating the video system of claim 1, wherein the reference frames of the video comprise MPEG I-frames and the update frames of the video comprise at least one of MPEG P-frames and MPEG B-frames.

5. The method of operating the video system of claim 1, further comprising:
in the video server, querying a terrestrial position determining equipment system for the geographic location of the wireless communication device;
in the terrestrial position determining equipment system, receiving the query, obtaining the geographic location, and transferring the geographic location; and
in the video server, receiving the geographic location.

6. The method of operating the video system of claim 1, further comprising:
in the wireless communication device, determining the geographic location of the wireless communication device and transferring the geographic location;
in the video server, receiving the geographic location.

7. The method of operating the video system of claim 1, wherein the group of predefined geographic areas comprises geographic regions of the wireless communication system and wherein the geographic regions indicate regions of a particular bandwidth of wireless communications between the wireless communication system and the wireless communication device.

8. The method of operating the video system of claim 1, wherein the group of predefined geographic areas comprises geographic regions of the wireless communication system and wherein the geographic regions indicate regions of a particular signal strength of wireless communications between the wireless communication system and the wireless communication device.

9. The method of operating the video system of claim 1, further comprising:
in the video server, querying a database with the geographic location and receiving a response from the database indicating if the geographic location is within the group of predefined geographic areas.

10. The method of operating the video system of claim 1, further comprising:
in the wireless communication device, monitoring a playback quality of the video and transferring an indicator of the playback quality to the video server over the wireless communication system.

11. A method of operating a video system, comprising:
in a video server, receiving a request for a video from a wireless communication device over a wireless communication system;
in the video server, requesting a geographic location of the wireless communication device;
in the video server, requesting the video from a media storage system;
in the media storage system, processing the request for the video and transferring the video to the video server;
in the video server, monitoring the geographic location and transferring reference frames of the video for delivery to the wireless communication device over the wireless communication system if the geographic location is within a group of predefined geographic areas and stopping the transfer of the reference frames if the geographic location is not within the group of predefined geographic areas;
in the video server, transferring update frames of the video for delivery to the wireless communication device over the wireless communication system without regard to whether the geographic location is within the group of predefined geographic areas.

12. The method of operating the video system of claim 11, wherein transferring the reference frames comprises transferring the reference frames over a first logical transport link;
wherein transferring the update frames comprises transferring the update frames over a second logical transport link; and further comprising:
in the wireless communication device, receiving the reference frames of the video over the first logical transport link and the update frames of the video over the second logical transport link and determining a playback sequence among the reference frames of the video and the update frames of the video.

13. The method of operating the video system of claim 12, wherein the first logical transport link comprises a first transportation port of the wireless communication device and the second logical transport link comprises a second transportation port of the wireless communication device.

14. The method of operating the video system of claim 11, wherein the reference frames of the video comprise MPEG I-frames and the update frames of the video comprise at least one of MPEG P-frames and MPEG B-frames.

15. The method of operating the video system of claim 11, wherein the group of predefined geographic areas comprises geographic regions of the wireless communication system and wherein the geographic regions indicate regions of a particular bandwidth of wireless communications between the wireless communication system and the wireless communication device.

16. The method of operating the video system of claim 11, wherein the group of predefined geographic areas comprises geographic regions of the wireless communication system and wherein the geographic regions indicate regions of a particular signal strength of wireless communications between the wireless communication system and the wireless communication device.

17. The method of operating the video system of claim 11, further comprising:
- in the video server, querying a database with the geographic location and receiving a response from the database indicating if the geographic location is within the group of predefined geographic areas.

18. A communication system comprising:
- a video server configured to receive a request for a video from a wireless communication device;
- the video server configured to monitor a geographic location of the wireless communication device and transfer reference frames of the video for delivery to the wireless communication device if the geographic location is within a group of predefined geographic areas and stop the transfer of the reference frames if the geographic location is not within the group of predefined geographic areas;
- the video server configured to transfer update frames of the video for delivery to the wireless communication device without regard to whether the geographic location is within the group of predefined geographic areas;
- the wireless communication device configured to receive the video, process the reference frames and the update frames to determine a playback sequence of the video, and display the video in the playback sequence.

19. The communication system of claim 18, comprising:
- the video server configured to transfer the reference frames of the video over a first logical transport link and the update frames of the video over a second logical transport link; and
- the wireless communication device configured to receive the reference frames of the video over the first logical transport link and the update frames of the video over the second logical transport link and determine a playback sequence among the reference frames of the video and the update frames of the video.

20. The communication system of claim 18, wherein the reference frames of the video comprise MPEG I-frames and the update frames of the video comprise at least one of MPEG P-frames and MPEG B-frames.

\* \* \* \* \*